US011449817B1

(12) United States Patent
Ahmadi et al.

(10) Patent No.: US 11,449,817 B1
(45) Date of Patent: Sep. 20, 2022

(54) SYSTEM AND METHOD FOR PSYCHOSOCIAL TECHNOLOGY PROTOCOL FOCUSED ON THE REDUCTION FOR CAREGIVER BURNOUT AND NURSING HOME PLACEMENT

(71) Applicant: TCARE Inc., St. Louis, MO (US)

(72) Inventors: Mohammad Ali Ahmadi, St. Louis, MO (US); Michael Mings, St. Louis, MO (US); Vijay Anand, Buffalo Grove, IL (US)

(73) Assignee: TCARE Inc., St. Louis, MO (US)

( * ) Notice: Subject to any disclaimer, the term of this patent is extended or adjusted under 35 U.S.C. 154(b) by 0 days.

(21) Appl. No.: 17/523,751

(22) Filed: Nov. 10, 2021

(51) Int. Cl.
*G06Q 10/06* (2012.01)
*G06Q 30/02* (2012.01)
*G06F 16/25* (2019.01)
*G06N 5/02* (2006.01)

(52) U.S. Cl.
CPC ....... *G06Q 10/0635* (2013.01); *G06F 16/258* (2019.01); *G06Q 30/0203* (2013.01); *G06N 5/022* (2013.01)

(58) Field of Classification Search
None
See application file for complete search history.

(56) References Cited

U.S. PATENT DOCUMENTS

| 6,648,649 B2 | 11/2003 | Rappaport |
| 8,311,850 B2 | 11/2012 | Johnson et al. |
| 9,427,185 B2 | 8/2016 | Yom-Tov et al. |
| 11,328,796 B1 * | 5/2022 | Jain .................. G16H 10/20 |
| 11,342,051 B1 * | 5/2022 | Jain .................. H04W 4/80 |
| 2005/0283384 A1 | 12/2005 | Hunkeler et al. |
| 2006/0150989 A1 | 7/2006 | Migaly |
| 2010/0114596 A1 | 5/2010 | Williams et al. |
| 2010/0138233 A1 | 6/2010 | Williams et al. |
| 2014/0095181 A1 | 4/2014 | Johnson et al. |
| 2018/0261319 A1 | 9/2018 | Bowie et al. |
| 2019/0114574 A1 | 4/2019 | Greenawalt |
| 2020/0020454 A1 | 1/2020 | McGarvey et al. |

(Continued)

FOREIGN PATENT DOCUMENTS

| CA | 2805713 A1 * | 1/2012 | ........... G06F 19/345 |
| WO | 2013149330 A1 | 10/2013 | |
| WO | WO-2019012471 A1 * | 1/2019 | ........... A61B 5/0006 |

(Continued)

OTHER PUBLICATIONS

Van den Brink RH, Troquete NA, Beintema H, et al. Risk assessment by client and case manager for shared decision making in outpatient forensic psychiatry. BMC Psychiatry. 2015;15:120. Published May 27, 2015. doi:10.1186/s12888-015-0500-3 (Year: 2015).*

(Continued)

*Primary Examiner* — Mehmet Yesildag
(74) *Attorney, Agent, or Firm* — Christopher Mayle; Bold IP, PLLC

(57) ABSTRACT

A system and method for a protocol to identify patterns among caregivers and predict the root cause of burnout, whereby the system leverages proprietary data and data collected form third party sources to assess the risk of caregivers and then adjusts accordingly based on previous data of the caregivers as well as other similar caregivers.

16 Claims, 3 Drawing Sheets

(56) References Cited

U.S. PATENT DOCUMENTS

2021/0065854 A1    3/2021    Hanold et al.
2021/0224824 A1*   7/2021    Bowers ................ G06F 40/186

FOREIGN PATENT DOCUMENTS

WO    WO-2019246032 A1 * 12/2019
WO       2020105733 A1    5/2020

OTHER PUBLICATIONS

Ruiz S, Snyder LP, Giuriceo K, et al. Innovative Models for High-Risk Patients Use Care Coordination and Palliative Supports to Reduce End-of-life Utilization and Spending. Innov Aging. 2017;1(2):igx021. Published Nov. 20, 2017. doi:10.1093/geroni/igx021 (Year: 2017).*

* cited by examiner

SYSTEM AND METHOD FOR PSYCHOSOCIAL TECHNOLOGY PROTOCOL FOCUSED ON THE REDUCTION FOR CAREGIVER BURNOUT AND NURSING HOME PLACEMENT

FIELD OF DISCLOSURE

The field of disclosure is generally directed to psychosocial technology protocol based on evidence based on protocol and more particularly a protocol based on identity discrepancy theory of a caregiver that provides machine learning models to identify patterns among caregivers to predict their root cause of burnout.

BACKGROUND

There is no such thing as an "average" caregiver. Specific families, cultures, and expectations concerning duties they are supposed to perform—even the amount of pressure they feel to take on the caregiving role in the first place—are all variables that affect the experience of a caregiver. And because every caregiver experience is a unique situation, knowing how one caregiver experiences the role tells us very little about how other caregivers, even if they are performing similar duties, experience their own role.

When trying to identify challenges and prevent caregiver burnout, most people tend to focus on the following duties of caregivers—how many hours are spent cooking, cleaning, providing personal care, and more. However, through our 35+ years of research, we have discovered that burnout is not a result of the hours put into doing laundry or picking up medication from the pharmacy. Instead, it's a result of identity discrepancy.

The first time a woman bathes her mother-in-law. The first time a wife has to take away her husband's car keys. The first time a person ceases to see themselves as a daughter or wife—but instead as a caregiver. This is called Identity Discrepancy—a conflict between how a caregiver sees themselves in relation to their loved one and the caregiving tasks they are now required to provide. Taking on new responsibilities as a caregiver makes caregivers see themselves as more of a nurse or a home aide, rather than a loved family member. And this conflict between their identities is what can cause distress. The level of distress depends on how much a caregiver's current identity within their relationship clashes with what the caregiver duties they are now responsible for.

Caregiving is a series of transitions that result from changes in the caregiving context. Over time, the needs of a family member will increase in quantity and intensity, and so naturally, the duties of a caregiver will increase as well. In the beginning, caregiving might look like picking up groceries for mom on the way home from work. Over time, it could evolve into the caregiver moving in with mom to give them 24/7 care. The visits become less about "catching up and spending time" and more about "cleaning, cooking, and taking care." Through these changes, caregivers will experience different stages of caregiving.

The process of identity change in caregiving often includes some of the below phases:

A son may start taking his mother shopping for groceries when it becomes difficult for her to go on her own. A wife may take on financial tasks when her husband's dementia progresses even though, at one point, it was part of his responsibilities in the household.

In many cases, these activities involve helping a loved one with personal grooming. For some caregivers—adult children, for example—and for recipients, this type of care can cause varying levels of discomfort. This phase may require duties that the caregiver is not comfortable with, and can cause the caregiver to leave their caregiving role. This can cause other changes like a move to a nursing home for a family member.

Caregivers see themselves more as caregivers than a loved one who occasionally drops by. And although the option of moving the care receiver into a nursing home is considered at every stage, it is now reconsidered more frequently.

A care recipient may be moved to a different setting and the caregiver turns over the primary responsibility for care to formal care providers but informal caregiving doesn't end here; the new arrangement allows the caregivers to recover a part of their original identity. Typically, the responsibilities of the caregiver now include legal, financial, and future care planning of the recipient in the new living environment. Not every caregiver goes through every phase, and transitions aren't always necessarily in one direction. The only uniform part of the process is that caregivers experience distress when their identity doesn't match up with the activities they are doing—and this prompts a movement between phases. Their distress is relieved by the transition, as their identities once again begin to match up with their caregiving activities.

Thus exists the need that is grounded on focusing on identity discrepancy as the primary driver of the emotional drain on a caregiver. By addressing these transitions in a caregiver's journey and tailoring interventions specific to their needs, we have found great success in reducing caregiver burnout. Currently, 84% of caregivers report lower levels of stress and depression in as few as six months after a TCARE intervention, and nursing home placement is delayed by 21 months.

SUMMARY

The present invention is directed to a risk reduction system comprising, one or more databases coupled via a network, a computing system having a non-transitory computer-readable medium comprising code, the computing system having one or more processors coupled to the one or more databases over the network, wherein instructions are executed by the computing system to perform: maintaining a database of the one or more databases on a server in communication with one or more third party computing device systems and one or more user computing device systems, storing a plurality of user profiles, each user profile being unique and being associated with a first unique user entity accessible by the one or more user computing device systems, wherein at least one first unique user profile comprises personal information related to a first unique user and information representing at least one risk identifier of the first unique user that have been determined to be associated with the first unique user, the server adapted to access the one or more databases and to receive inputs, including from the one or more user computing device systems, collecting one or more responses in questionnaire from the one or more user computing device systems by one or more queries, transforming extracted data of the questionnaire into to a standardized format by stripping the one or more responses for one or more details and uploading the one or more details with additional fields cataloging the one or more responses using one or more active machine learning and artificial intelligence processes in real time, storing the one or more responses in the one or more databases, identifying one or more risks associated with the first unique user using one or more algorithms, determining a score from the one or more risks, measured in any of the six proprietary burden scales of relationship burden, objective burden, stress, depression, uplifts, and identity discrepancy, generating a care plan from the one or more risks identified associated with the first unique user, transmitting the care plan to the one or more user computing device systems, optimizing a response system for the first unique user based on the care plan, generating a risk alert of the first unique user if the one or more identified responses are identified at a predetermined amount of occurrence, generating a notification to a third party in response to the generated risk alert of the first unique user, leveraging historical datasets of the first unique user to identify one or more goals wherein the care plan is generated from the leveraging of mapping of the one or more goals, grouping or categorizing the one or more responses into clusters to determine a root cause or other supplementary causes of burnout based on historical patterns of the first unique user, analyzing aggregated data of the one or more responses to provide insights relevant to geographic and behavioral statistics and geographic, location, and language distributions, integrating data from one or more networks associated with the first unique user into the risk reduction system, creating a hierarchical structure of the one or more identified responses and associated analysis information, the hierarchical structure having descriptors, the descriptors identifying characteristics of one or more data and any clusters associated with the one or more data, wherein the response system includes periodically checking in with the first unique user by phone or text, wherein the response system includes providing gifts, services or other items that may assist in reducing burnouts.

The present invention is directed to a method for risk reduction system comprising, storing a plurality of user profiles on one or more databases, each user profile being unique and being associated with a first unique user entity accessible by one or more user computing device systems, wherein at least one first unique user profile comprises personal information related to a first unique user and information representing at least one risk identifier of the first unique user that have been determined to be associated with the first unique user, wherein a server adapted to access the one or more databases and to receive inputs, including from the one or more user computing device systems, collecting one or more responses in questionnaire from the one or more user computing device systems by one or more queries, storing the one or more responses in the one or more databases, identifying one or more risks associated with the first unique user using one or more algorithms, determining a score from the one or more risks, measured in any of six proprietary burden scales of relationship burden, objective burden, stress, depression, uplifts, and identity discrepancy, generating a care plan for the first unique user, optimizing a response system for the first unique user based on the care plan, wherein the response system includes periodically checking in with the first unique user by phone or text and providing gifts or services to the first unique user, adjusting the response system in response to subsequent scores of the first unique user, generating a risk alert of the first unique user if the one or more identified responses are identified at a predetermined amount of occurrence, generating a notification to a third party in response to the generated risk alert of the first unique user, leveraging historical datasets of the first unique user to identify one or more goals wherein the care plan is generated from the leveraging of mapping of the one or more goals, grouping or categorizing the one or more responses into clusters to determine a root cause or other supplementary causes of burnout based on historical patterns of the first unique user, analyzing aggregated data of the one or more responses to provide insights relevant to geographic and behavioral statistics and geographic, location, and language distributions, integrating data from one or more networks associated with the first unique user into the risk reduction system, and creating a hierarchical structure of the one or more identified responses and associated analysis information, the hierarchical structure having descriptors, the descriptors identifying characteristics of one or more data and any clusters associated with the one or more data.

DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
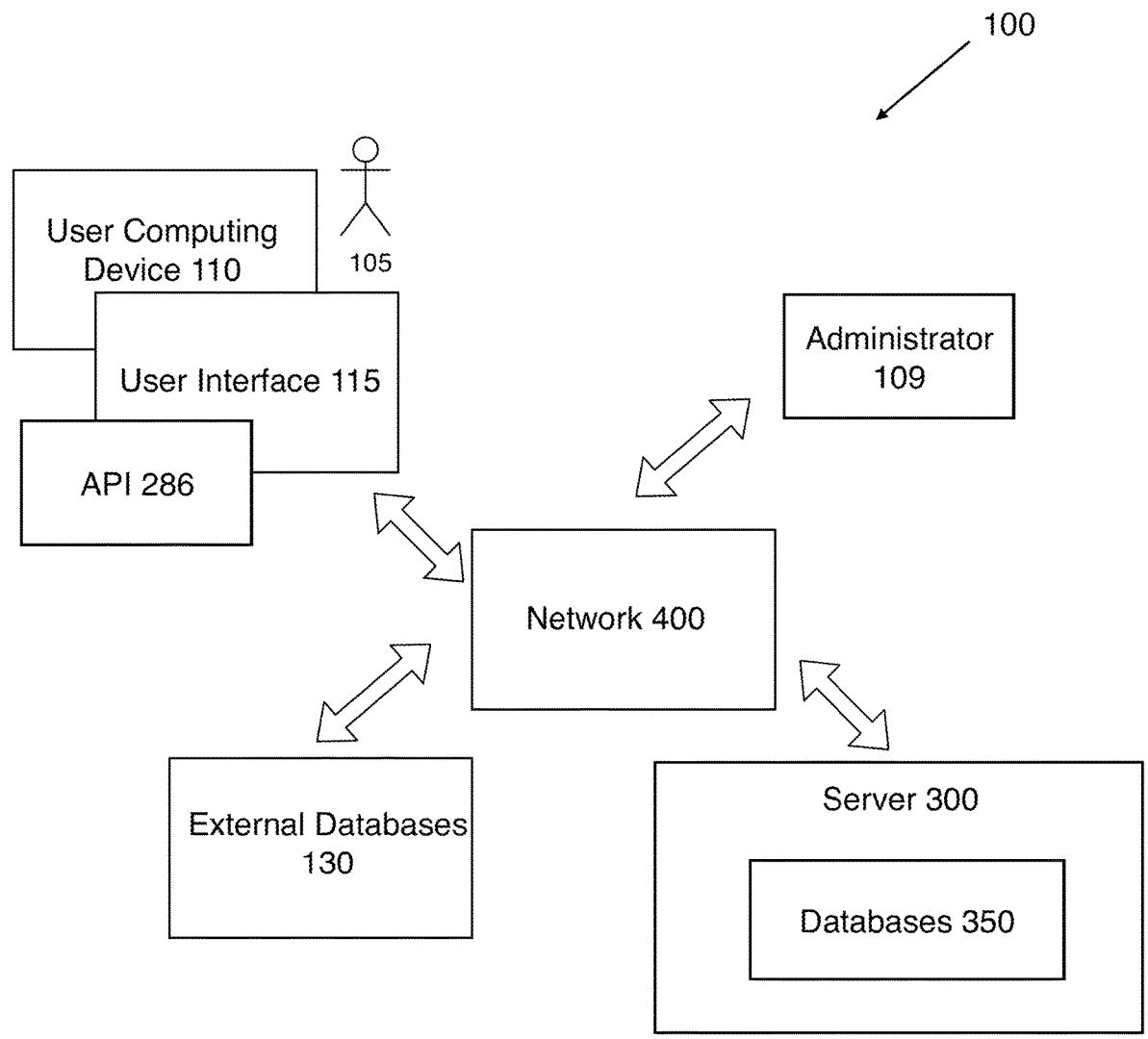
FIG. 1 is directed to a block diagram of one exemplary embodiment of system and method for psychosocial technology protocol focused on the reduction for caregiver burnout.

In the Summary above and in this Detailed Description, and the claims below, and in the accompanying drawings, reference is made to particular features of the invention. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure is generally drawn to a system and method, according to one or more exemplary embodiments, for a protocol to identify patterns among caregivers and predict the root cause of burnout. The system leverages proprietary data and data collected form third party sources to assess the risk of the caregiver. The overall method starts with engaging the caregiver using any of 5 different models including telephonic, mail, email, web, and in person. The caregiver then may be assessed based on one or more models whereby it can quickly be determined if the caregiver is at a low, medium, or high risk of burnout whereby, based on the psychosocial models of identity discrepancy, the caregiver may be administrated a motivation interview process. The risk of caregiver burnout is measured in six proprietary burden scales of relationship burden, objective burden, stress, depression, uplifts, and identity discrepancy. Algorithms and machine learning models then leverage historical datasets to identify goals, strategies, and resource categories for the caregiver. A care plan then may be generated for the caregiver from the leveraging of the resource database and the mapping of the goals. The caregiver then may be referred to resources in their local community or resources that are virtually available. The system then continuously engages the caregiver through SMS based automated messaging or other methods to identify if the caregiver risk is above a certain threshold.

With reference now to FIG. 1, FIG. 1 illustrates a block diagram of one exemplary embodiment of a system and method for a psychosocial technology protocol focused on the reduction for caregiver burnout and nursing home placement which is referred to as caregiver risk reduction system 100 in FIG. 1 and throughout the present description. In one or more non-limiting embodiments, caregiver risk reduction system 100 may be innate, built into, or otherwise integrated into existing platforms or systems such as a website, a third-party program, APPLE operating systems (e.g., iOS), ANDROID, SNAPCHAT, INSTAGRAM, FACEBOOK, or any other platform. Caregiver risk reduction system 100 may include one or more users, such as user 105.

Users 105 may be individuals, businesses, or other entities whereby users may have the capacity to function as an individual. Users 105 of caregiver risk reduction system 100 may access a user interface such as user interface 115 using a user computing device such as user computing device 110. User interface 115 may have a plurality of buttons or icons that are selectable through user interface 115 by user 105 to instruct caregiver risk reduction system 100 to perform particular processes in response to the selections.

Caregiver risk reduction system 100 may also include one or more administrative entities such as system administrator 109. While system administrator 109 is depicted as a single element in FIG. 1 communicating over network 400, there may be multiple system administrators 109, in one or more non-limiting embodiments, that may be distributed over a network such as network 400 in any number of physical locations. System administrator 109 may manipulate the software and enter commands to server 300 using any number of input devices such as keyboard and mouse. System administrator 109 may also have responsibilities related to security, patches, updates, and overall general program maintenance. User 105 may also be their own "User Administrator" and may be responsible for databases 350.

User computing devices 115 may be in communication with one or more servers 300 such as server 300 via one or more networks such as network 400. Server 300 may be located at a data center or any other location suitable for providing service to network 400 whereby server 300 may be in one central location or in many different locations in multiple arrangements. Server 300 may comprise a database server such as MySQL® or Maria DB® server or any other type or brand for a database server. Server 300 may have an attached data storage system storing software applications and data. Server 300 may have a number of modules that provide various functions related to communication system 100. These modules may be in the form of software or computer programs that interact with the operating system of server 300 whereby data collected in databases as instruction-based expressions of components and/or processes under communication system 100 may be processed by one or more processors within server 300 or another component of caregiver risk reduction system 100 as well as in conjunction with the execution of one or more other computer programs.

Caregiver risk reduction system 100 may include one or more databases 350 including a number of data, files, and/or folders. In one embodiment, databases 350 may include a directory of names and their corresponding risk identifiers, a directory of their answers, as well as any information associated with the user and any care plan provided to the user.

Modules may be configured to receive commands or requests from user computing devices 115, server 300, and other connected devices over network 400. Server 300 may include components, subsystems, and modules to support one or more management services for communication system 100. For example, server 300 may include a module configured to allow chatting between user 105 and administrators 109 to maintain presence risk information for one or more users 105 and to provide chat functionality allowing users 105 to communicate information corresponding to user 105 in a chat through communication system 100 as well as video conferencing, phone calls, or text messages.

Modules may be configured to receive commands or requests from user computing devices 110 and communicate appropriate responses to requesting computing devices. Sever 300 may have a control module with appropriate firmware or software and an operating system to control overall operation and configuration of the system. The controller module may be operable communication with a network interface module, which provides interface functionality over one or more networks (wired or wireless) and possibly connectivity with other communication media.

The controller module may also be in communication with an audio module and a video module which receive and process audio and video data, respectively, from user computing devices 110 for video conferencing and video chat. The audio module may include, among other modules or components for processing audio data, speech detection and recognition modules and codecs for processing incoming or outgoing video data. A speech detection module can be configured to detect instances of speech at a site (for example, to trigger recording or other functions of the communication system 100 and/or determine the relative physical location of the detected speech for use in controlling the operation of individual microphones at the site). Speech recognition may be used to distinguish between individual voices for the purpose of filtering out other voice.

The video module may include image recognition modules for use in detecting speech or distinguishing between users and appropriate codecs for use in processing incoming or outgoing video data. The image recognition modules may include face tracking or pattern recognition algorithms. The audio and video modules may also include, respectively, interfaces for data communication between input units such as microphones and cameras and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Caregiver risk reduction system 100 may also be equipped with security modules providing end-to-end security with other systems and intermediate host systems.

In one or more non-limiting embodiments, network 400 may include a local area network (LAN), such as a company Intranet, a metropolitan area network (MAN), or a wide area network (WAN), such as the Internet or World Wide Web. Network 400 may be a private network, a public network, or a combination thereof. Network 400 may be any type of network known in the art, including telecommunications networks, a wireless network (including Wi-Fi), and a wireline network. Network 400 may include mobile telephone networks utilizing any protocol or protocols used to communicate among mobile digital computing devices (e.g., user computing device 110), such as GSM, GPRS, UMTS, AMPS, TDMA, or CDMA. In one or more non-limiting embodiments, different types of data may be transmitted via network 400 via different protocols. In alternative embodiments, user computing devices 110, may act as standalone devices and/or may operate as peer machine in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies available now or in the future that may provide for broader coverage between computing devices if, for instance, they are in a remote location not accessible by other networks.

User computing devices 110, may be any type of computing device that typically operates under the control of one or more operating systems which control scheduling of tasks and access to system resources. User computing devices 110 may be mobile computing devices such as an iPhone™, Android-based™ phone, or Windows-based™ phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processing power and memory to perform and execute instructions and operations for caregiver risk reduction system 100. User computing devices 110 may have location tracking capabilities such as Mobile Location Determination System (MLDS) or Global Positioning System (GPS) whereby they may be capable of determining the geographical location of the user computing device.

Figure 2:
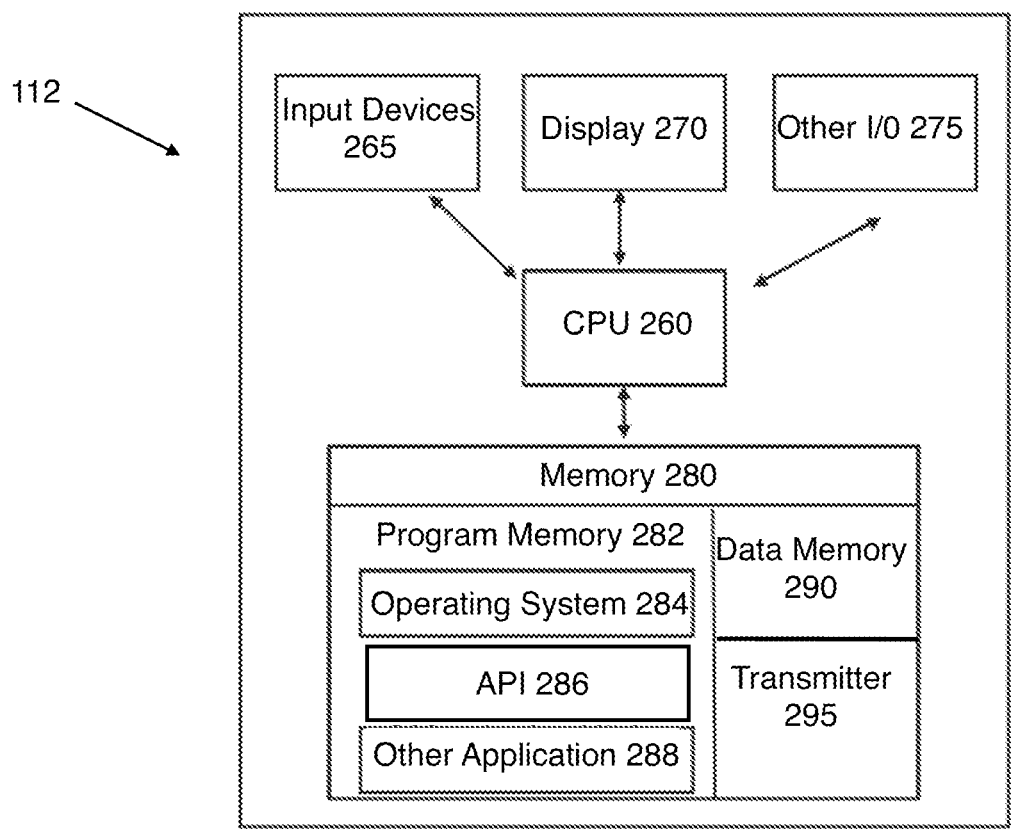
FIG. 2 is directed to a block diagram showing various components of user computing device

Turning to FIG. 2, FIG. 2 is a block diagram showing various components of user computing device 110. User computing device 110 may include a housing for containing one or more hardware components that allow access to edit and query communication system 100. User computing device 110 may include one or more input devices such as input devices 265 that provide input to a CPU (processor) such as CPU 260 of actions related to user 105. Input devices 265 may be implemented as a keyboard, a touchscreen, a mouse, via voice activation, wearable input device, a camera a trackball, a microphone, a fingerprint reader, an infrared port, a controller, a remote control, a fax machine, and so on.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also include a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, and so on.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 110.

User computing device 110 may have a transmitter, such as transmitter 295, to transmit data. Transmitter 295 may have a wired or wireless connection and may comprise a multi-band cellular transmitter to connect to the server 300 over 2G/3G/4G/5G or other cellular networks. Other embodiments may also utilize Near Field Communication (NFC), Bluetooth, or another method to communicate information.

Users 105 may initially register to become a registered user 105 associated with caregiver risk reduction system 100. Caregiver risk reduction system 100 may be downloadable and installable on user computing devices 110 or may be connected manually by administrators 109 to users 105 on any suitable device. Further, caregiver risk reduction system 100 may be implemented using a web browser via a browser extension or plugin.

Upon initially signing up with caregiver risk reduction system 100, user 105 may be prompted to provide an email address and password or other forms of login credentials known by those of ordinary skill in the art. User 105 may then be prompted to provide a two-tier verification method whereby user 105 may request to receive a verification code or token through email or text. A code or token may be generated by server 300 and transmitted to user's 105 email or user computing device 110 by text message whereby user 105 may validate his or her identity by entering the generated code he or she has received into a text block window. In some embodiments, user 105 may receive a mailto link presented in the email sent by server 300. Once selected, user 105 may be directed to a website containing a preformatted message whereby the mailto link composes a message that will deliver a unique token to server 300. The unique digital token embedded in the email provides extremely secure authentication, and the utilization of the mailto link may create a very simple experience for user 105.

Once user 105 has validated their identity, user interface 115 may present user 105 with a text window interface whereby user 105 may enter their name, the caregiver recipient home phone number, cellphone number, email address, physical address, and any other notes. In some embodiments, user 105 may do this through user computing device 110 whereby the contact information is uploaded to server 300 in standardized format.

During account creation, account information for user 105 may also be verified from a variety of distinct or different sources, such as from a government entity, a driver license bureau, passport office, third party security service, or by any methods known by those of ordinary skill in the art. For example, this information may be further verified by an employee number, passport number, driving license number, and credit card numbers to name a few examples. Further, various sources may independently verify the data for confirmation in one or more embodiments. Also, verification may be prioritized as some sources of verification may be more reliable than other sources such as being verified by a government organization (e.g., driver license bureau, passport office, etc.), and may be considered more secure than an employer provided identity or an identity from an internet service provider. If verification by server 300 is successful, user 105 may be granted access to caregiver risk reduction system 100.

Figure 3:
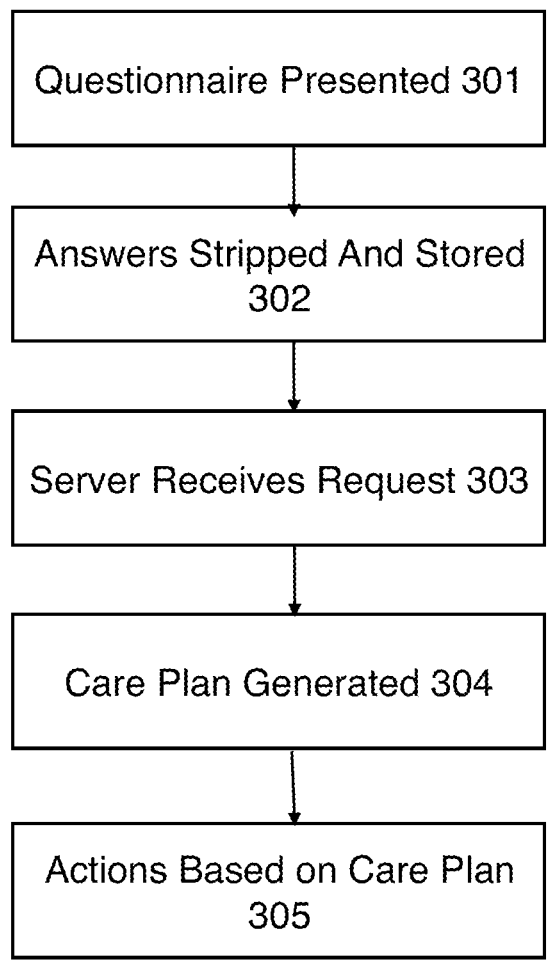
FIG. 3 illustrates flow chart showing an exemplary method of caregiver risk reduction system.

FIG. 3 illustrates flow chart showing an exemplary method of caregiver risk reduction system 100. In one embodiment, user 105 is able to enroll for services for risk assessment and resolution through a custom tailored care plan involving one or more block components included in FIG. 1, such as, without limitation, user computing device 110, administrator 109, server 300, and network 400. Further, one or more exemplary method steps may be performed by caregiver risk reduction system 100, including server 300 and user computing devices 110, which may be interconnected via network 400.

Administrator 109 may initiate a session over network 400 with user computing device 110 or may manually connect to user 105 through various methods including a telephone call or text message or in person. Alternatively, or additionally, caregiver risk reduction system 100 may be preinstalled by the manufacturer or service provider on user computing device 110. In some embodiments, user 105 may navigate to a specific web address to initiate a session.

At step 301, a questionnaire may be presented to user 105 to determine if user 105 is at risk for burnout. The questionnaire collects important information in order to acquire better guidance in relation to the needs of user 105. In some non-limiting embodiments, the questionnaire may be mailed, emailed, or administered telephonically to user 105 when it has been determined user 105 is assisting as a caregiver, for example from a third-party system such as a hospital.

The questionnaire may include a short list of ratings or multiple-choice questions displayed electronically on a user interface 115, displayed by print on hardcopy, or verbally asked of user 105. In particular, the questions may be displayed on user computing device 115. User 105 may respond to the questionnaire by selecting a response from a multiple choice question or inserting an answer in a text box window to which the customer responds by typing into user interface 110, manually responding to an administrator, or verbally responding telephonically. User 105 response may then be transmitted to and stored in databases 350 with an association of the user's 105 user profile information.

At step 302, the questionnaire responses or answers may be stripped for information whereby the answers are stored in databases 350 with one or more details with additional fields cataloging the various answers as well previous answers made by user 105 on previous questionnaires or interactions through system 100. This information may be visualized in a drop down menu or overlaid stack where the previous answers are positioned beneath the current answer such that the history of user 105 may be determined.

During this analysis of responses, processes may be performed by server 300 on responses which enables classifications to be associated with the responses into a hierarchical structure to facilitate analysis, searching, and recognition of risk burnout.

Responses may be identified using a descriptor for creating the hierarchical structure. Responses may include descriptors which identify characteristics of the responses or unique user and any feature clusters associated with the responses. The descriptors may be defined in a hierarchical tree structure with the top-level descriptor mapping to the highest branch. For each branch descriptor, labels may be assigned and stored in the databases 350 to facilitate search and presentation. From each branch descriptor, additional branches may be defined, for example, second-level branch descriptors that branch off from the first branch descriptor. Additional branch descriptors may branch off from the second brand descriptor. Each descriptor is associated with clusters of features that are common to data and can be mapped together.

At step 303, server 300 may receive a notification that a "risk assessment request" has been initiated by the responses from user 105 whereby an analysis based on one or more algorithms or machine learning may decide risk of caregiver burnout using any of 6 proprietary scales on relationship burden, objective burden, stress, depression, uplifts, and identity discrepancy. The scales may be weighted based on previous big data collected from users 105 such as their location determined by GPS as well as identifying information for users 105 such as age, race, or other criteria.

At step 303, a score may be generated based on the analysis from the one or more algorithms and machine learning and transmitted to databases 350 whereby system 100 utilizes the information stored on databases 350 of server 300 and information collected by from third-party sources and databases whereby the attributes may be sorted into one or more clusters to determine the root cause or other supplementary causes of the burnout based on historical patterns of previous users 105 including the user 105 who has taken the test.

The clusters are designed to help provide a better care plan based on the specific user 105 and improved search results for the administrator 109. The clusters may be weighted differently to determine the overall score and sub scores as well. For instance, previous users 105 may have had two causes of burnout. If a predetermined number of users 105 have these causes of burnout, a correlation may be determined and these causes may be put into a cluster to assist in the creation of care plans.

Server 300 may also determine aggregated statistics related to activity of users 105, level of caregiver engagement, and other corresponding identifiers as well as geographic location and language distributions.

At step 304, after the score has been determined, a care plan associated with user 105 may be generated and accessed by user 105 accessing their user profile or manually receiving it from administrator 109. In one embodiment, the user profile may reside in databases 350 on server 300, which may be accessed and referenced using an identifier provided by user 105 as part of the registration process or login process such as an account name and password. User profile page may be custom tailored in response to the questionnaire responded to by users 105 whereby users 105 may be presented with their care plan and other helpful information as well as advertisements or assistance information designed to focus their specific attention (based on region, city, personal question, etc. as calculated from their GPS or inputted information).

After successfully receiving questionnaires, scores, risk assessment, and care plan, system 100 may retrieve data associated with users 105 whereby caregiver risk reduction system 100 may apply this data to future assessments. Depending on the situation, this information may also be relayed or notified to third party systems depending on the score or how many times the score has been reached over a predetermined time period. Once a care plan has been selected, a digital proof of ownership is then created in the form of a unique identifier corresponding with the unique user 105 information and care plan information, whereby the association is stored in databases 350.

At step 305, upon successful selection of the care plan, system 100 may create an association for user 105 with the care plan whereby an analysis based on one or more algorithms may be used to select one or more actions based on the care plan. System 100 may optimize a response system for users 105 based on the care plan including, but not limited to, messaging, calling, emailing, or transmitting audio or video to user 105 periodically to check in with them, or providing gifts or other items that may assist in reducing burnouts. The response system may automatically change or be adjusted in response to subsequent questionnaires filled out by user 105 based on improvement or diminishing results from the scores and risk assessments to provide a different approach that may be more successful. This adjustment may be switching the form of communication or the type of gift in response to the questionnaires by user 105 and other previous users 105. Different subsets of users 105 may be grouped identified based on geographic location, age, gender, type of caregiving, or other criteria to determine the appropriate adjusting of the gifts. These subsets may also be sent collective gifts or joined together in events.

Server 300 may generate synchronization messages, such as an email message, text message, or calendar invitation for each user 105 related to the risk assessment causing one or more scheduled goals or tasks that prevent burnout to be included in a local personal information manager application connected to caregiver risk reduction system 100, such as Microsoft Outlook and Google Calendar. In one implementation, the synchronization message may include a calendar data exchange file, such as an iCalendar (.ics) file in compliance with IETF RFC 5545. In further embodiments server 300 may receive users' 105 appointment schedules that correspond to caregiver support and correlate this with generated care plans to accommodate for specific scheduling beneficial to all parties as well as determine further burnout.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed:
1. A risk reduction system comprising:
   one or more databases coupled via a network; and
   a computing system having a non-transitory computer-readable medium comprising code, the computing system having one or more processors coupled to the one or more databases over the network, wherein instructions are executed by the computing system to perform:
   maintaining a database of the one or more databases on a server in communication with one or more third party computing device systems and one or more user computing device systems;
   storing a plurality of user profiles, each user profile of the plurality of user profiles being unique and being associated with a unique user accessible by the one or more user computing device systems, wherein at least one first unique user profile comprises personal information related to a first unique user and information representing at least one risk identifier of the first unique user that have been determined to be associated with the first unique user, the server adapted to access the one or more databases and to receive inputs, including from the one or more user computing device systems;
   receiving audio and video from the unique user on the one or more user computing device systems while in a video conference;

processing audio data, speech detection and recognition modules from the audio and the video while applying pattern recognition algorithms;

collecting one or more responses in questionnaires from the one or more user computing device systems by one or more queries;

transforming extracted data of the questionnaires into to a standardized format by stripping the one or more responses for one or more details and uploading the one or more details with additional fields cataloging the one or more responses using one or more active machine learning and artificial intelligence processes in real time;

storing the one or more responses in the one or more databases with the additional fields;

storing one or more second responses in the one or more databases with the additional fields;

identifying one or more risks associated with the first unique user, in response to the one or more responses and the one or more second responses, using one or more learning models wherein the one or more learning models generates a score from the one or more risks, measured in one or more scales of relationship burden, objective burden, stress, depression, uplifts, and identity discrepancy;

generating, by the one or more learning models, a care plan from the one or more risks identified associated with the first unique user;

utilizing a machine learning model to map a cluster to a value of risk reduction, wherein the machine learning model receives the one or more responses and one or more second responses, during learning, upon receipt from the one or more responses and the one or more second responses, maps the one or more responses and the one or more second responses to a first reason for burnout and a second reason for burnout, during learning, upon receipt of the first reason for burnout and the second reason for burnout determining a burnout overlap and associating the burnout overlap with the cluster, during analysis, upon receipt of one or more third responses mapping the one or more third responses to the cluster;

determining, via use of the machine learning model, an adjusted care plan based on the cluster and the one or more third responses;

transmitting, to the one or more user computing device systems, a notification indicating the adjusted care plan; and automatically engaging the unique user through a means of electronic communication including automated text message or the video conference to identify when the unique user is above a predetermined threshold of burnout, wherein the means of electronic communication is automatically modified to a second means of communication in response to diminishing results of subsequent questionnaires.

2. The risk reduction system of claim 1, wherein further instructions are executed by the computing system to perform: storing the one or more responses and the one or more second responses as an overlaid stack in the one or more databases where previous answers are positioned beneath a current answer for flow visualization.

3. The risk reduction system of claim 2, wherein the further instructions are executed by the computing system to perform: adjusting the one or more scales in response to previous results of one or more previous unique users.

4. The risk reduction system of claim 3, wherein the further instructions are executed by the computing system to perform: adjusting the one or more scales in response to a location, age, and race of the one or more previous unique users, the location determined from a GPS of one or more previous computing devices associated with the one or more previous unique users.

5. The risk reduction system of claim 4, wherein the further instructions are executed by the computing system to perform:

automatically generating a risk alert of the first unique user when one or more identified responses are identified at a predetermined amount of occurrence; and creating a digital proof of ownership in a form of a unique identifier corresponding with the unique user and relaying the digital proof of ownership to a third party computing device system in response to the generated risk alert of the first unique user.

6. The risk reduction system of claim 5, wherein the further instructions are executed by the computing system to perform:

generating synchronization messages fora calendar invitation on the one or more user computing device systems wherein one or more scheduled goals or tasks are created and appear on a calendar platform on the one or more user computing device systems.

7. The risk reduction system of claim 1, wherein further instructions are executed by the computing system to perform: receiving a first reason for burnout and a second reason for burnout from a plurality of previous unique users;

categorizing the first reason for burnout and the second reason for burnout into a stored digital cluster when a predetermined amount of the plurality of previous unique users have the first reason for burnout and the second reason for burnout overlapping; and adjusting the care plan in response to the stored digital cluster.

8. The risk reduction system of claim 7, wherein the further instructions are executed by the computing system to perform: in response to the questionnaires responded to the unique user with the care plan and advertisements or assistance information accounting for the unique user.

9. The risk reduction system of claim 6, wherein the further instructions are executed by the computing system to perform: integrating data from one or more networks associated with the first unique user into the risk reduction system to determine when the unique user is a caregiver and to have generated the care plan.

10. The risk reduction system of claim 9, wherein the further instructions are executed by the computing system to perform:

generating the synchronization messages for the calendar invitation with one or more events for the unique user and a subset of one or more previous unique users wherein the subset of previous unique users is determined by a type of caregiving stored in the one or more databases.

11. A method fora risk reduction comprising:

storing a plurality of user profiles on one or more databases, each user profile of the plurality of user profiles being unique and being associated with a unique user accessible by one or more user computing device systems, wherein at least one first unique user profile comprises personal information related to a first unique user and information representing at least one risk identifier of the first unique user that has been determined to be associated with the first unique user, wherein a server is adapted to access the one or more databases and to receive inputs, including from the one or more user computing device systems;

collecting one or more responses in questionnaire from the one or more user computing device systems by one or more queries;

storing the one or more responses in the one or more databases;

receiving audio and video from the unique user on the one or more user computing device systems while in a video conference;

processing audio data, speech detection and recognition modules from the audio and the video while applying pattern recognition algorithms;

identifying one or more risks associated with the first unique user using one or more machine learning models;

determining a score from the one or more risks, measured in any of six proprietary burden scales of relationship burden, objective burden, stress, depression, uplifts, and identity discrepancy;

generating a care plan for the first unique user;

utilizing a machine learning model to map a cluster to a value of risk reduction, wherein the machine learning model receives the one or more responses and one or more second responses, during learning, upon receipt from the one or more responses and the one or more second responses, maps the one or more responses and the one or more second responses to a first reason for burnout and a second reason for burnout, during learning, upon receipt of the first reason for burnout and the second reason for burnout determining a burnout overlap and associating the burnout overlap with the cluster, during analysis, upon receipt of one or more third responses mapping the one or more third responses to the cluster;

outputting, the cluster to a value of an adjusted care plan;

determining, via use of the machine learning model, the adjusted care plan based on the cluster;

transmitting, to the one or more user computing device systems, a notification indicating the adjusted care plan; and automatically engaging the unique user through a means of electronic communication including automated text message or the video conference to identify when the unique user is above a predetermined threshold of burnout, wherein the means of electronic communication is automatically modified to a second means of communication in response to diminishing results of subsequent questionnaires.

12. The method of claim 11, further comprising: automatically altering a weight of the six proprietary burden scales in response to one or more previous users.

13. The method of claim 11, further comprising: generating synchronization messages for a calendar invitation on the one or more user computing device systems wherein one or more scheduled goals or tasks for the care plan are created on a calendar platform.

14. The method of claim 13, further comprising: generating the synchronization messages for the calendar invitation with one or more events for the unique user and a subset of one or more previous users wherein the subset of the one or more previous users is determined by a type of caregiving stored in the one or more databases.

15. The method of claim 14, further comprising: sending collective gifts to the unique user and the subset of the one or more previous users.

16. The method of claim 15, further comprising: receiving from the calendar platform on the one or more user computing device systems one or more appointment schedules that correspond to caregiver support; and modifying the care plan and engagement.

* * * * *